United States Patent [19]

Takanashi et al.

[11] 4,418,987

[45] Dec. 6, 1983

[54] POLARIZER ARRANGEMENT FOR A SIGNIFICANT IMPROVEMENT IN VIEWING ANGLE CHARACTERISTIC IN A LIQUID CRYSTAL DISPLAY

[75] Inventors: Hiroshi Takanashi, Yamatokoriyama; Shoichiro Takahara, Nara, both of Japan

[73] Assignee: Sharp Kabushiki Kaisha, Osaka, Japan

[21] Appl. No.: 179,501

[22] Filed: Aug. 19, 1980

[30] Foreign Application Priority Data

Aug. 21, 1979 [JP] Japan .................. 54-106941

[51] Int. Cl.³ .................................... G02F 1/133
[52] U.S. Cl. .................................... 350/337; 350/341
[58] Field of Search .............. 350/337, 352, 370, 378, 350/389, 407, 339 R, 340, 341

[56] References Cited

U.S. PATENT DOCUMENTS 3,874,163 4/1975 Ikeno ..................... 350/337 X
3,914,022 10/1975 Kashnow ..................... 350/340

*Primary Examiner*—John K. Corbin
*Assistant Examiner*—David Lewis
*Attorney, Agent, or Firm*—Birch, Stewart, Kolasch & Birch

[57] ABSTRACT

A pair of polarizers are respectively attached to a pair of substrates forming a twisted nematic field effect mode liquid crystal display. An orientation control film is disposed on each of the pair of substrates to orient liquid crystal molecules of a liquid crystal material in a desired direction. Each of the pair of polarizers is attached to an outer surface of the respective substrates such that the plane of polarization of each of the polarizers is not in parallel with or perpendicular to a direction oriented by the orientation control film.

5 Claims, 9 Drawing Figures

POLARIZER ARRANGEMENT FOR A SIGNIFICANT IMPROVEMENT IN VIEWING ANGLE CHARACTERISTIC IN A LIQUID CRYSTAL DISPLAY

BACKGROUND OF THE INVENTION

The present invention relates to a liquid crystal display and, more particularly, to a polarizer arrangement employed within a twisted nematic field effect mode liquid crystal display.

Conventional twisted nematic field effect mode liquid crystal displays provided a small degree of display contrast when viewed along a direction perpendicular to the surface of the displays in operation. When viewed from an angle exceeding, say, 40°, images on the displays became unclear. As is well known in the art, this results from an increase in the $\gamma$ value defined as Vsat/Vth (Vsat: saturation voltage, Vth: threshold voltage).

In addition to the conventional displays providing very limited viewing angle characteristics, it was difficult for the conventional displays to show a clear color indication.

SUMMARY OF THE INVENTION

Accordingly, it is an object of the present invention to provide an improved twisted nematic field effect mode liquid crystal display.

It is another object of the present invention to compensate for the above noted deficiencies of known twisted nematic field effect mode liquid crystal displays.

It is a further object of the present invention to provide twisted nematic field effect mode liquid crystal display which gives a superior display independent of the viewing angle.

It is a further object of the present invention to provide an improved liquid crystal display showing a good display contrast.

It is a further object of the present invention to provide an improved polarizer arrangement applied to a liquid crystal display.

Other objects and advantages of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art.

To achieve the above objects, pursuant to an embodiment of the present invention, a pair of polarizers are respectively attached to a pair of substrates forming a twisted nematic field effect mode liquid crystal display wherein an orientation control film is disposed on each of the pair of substrates to orient liquid crystal molecules of a liquid crystal material in a desired direction. Each of the polarizers is attached to an outer surface of one of the pair of substrates such that the plane of polarization of each of the polarizers is not in parallel with or perpendicular to a direction oriented by the orientation control film.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
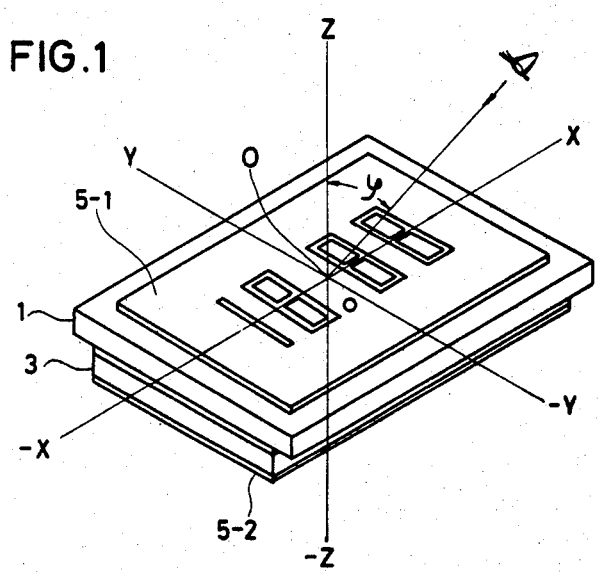
FIG. 1 is a perspective view of a twisted nematic field effect mode liquid crystal display according to the present invention.

Referring now to FIG. 1, there is illustrated a twisted nematic field effect mode liquid crystal display of the present invention comprising a pair of substrates 1 and 3, a pair of polarizers 5-1 and 5-2, and a liquid crystal mixture. A desirable patterned electrode such as a minus-in-square is formed on the substrate 1. A common electrode is formed on the substrate 3.

The observing direction factor $\phi$ is defined with reference to FIG. 1. The display surface of the liquid crystal display lies in a rectangular coordinate system, as shown, in such a manner that the X axis parallels one of major axes of the display and the Y axis parallels the other of the major axes of the display. The Z axis lies along a direction normal to the display surface. An angle $\phi$ represents an angle formed between an observing direction vector and the Z axis.

Figure 2:
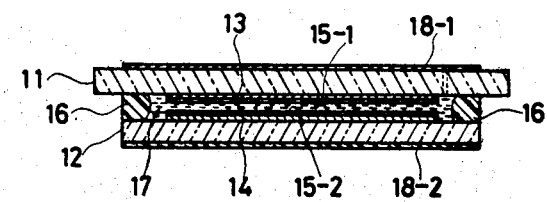
FIG. 2 is a cross-sectional view of the liquid crystal display of FIG. 1.

FIG. 2 shows a cross-sectional view of the liquid crystal display of FIG. 1. The liquid crystal display comprises a pair of substrates 11 and 12 corresponding to the elements 1 and 3, patterned electrodes 13 and 14, orientation films 15-1 and 15-2, spacers 16, a liquid crystal mixture 17, and a pair of polarizers 18-1 and 18-2 related to the elements 5-1 and 5-2.

The pair of substrates 11 and 12 may be formed of glass. The patterned electrodes 13 and 14 are disposed on the inner surface of substrates 11 and 12, respectively. It is preferable that the selected materials of the patterned electrodes 13 and 14 be $In_2O_3$ or $SnO_2$ etc. One patterned electrode 13 having four digits, e.g., may be formed in a desirable configuration such as a minus-in-square style while the other patterned electrodes 14 may be formed as a common electrode. On the electrodes 13 and 14, there is disposed the orientation films 15-1 and 15-2 by opaque evaporation methods, rubbing methods or the like. The orientation films 15-1 and 15-2 function to orient molecules of the liquid crystal mixture 17. The pair of polarizers 18-1 and 18-2 are attached to the outer surfaces of the pair of substrates 11 and 12 as illustrated in FIGS. 3 through 6.

FIGS. 3 through 6 are plan views of the liquid crystal display according to the present invention. Throughout these drawings, the solid line 19-1 with an arrow head represents orientation by the orientation film 15-1 formed on the inner surface of the substrate 11 and a solid line 20-1 with doubled arrow heads indicates the plane of polarization of the polarizer 18-1 attached to the outer surface of the substrate 11. The dotted line 19-2 with an arrow head indicates orientation by the orientation film 15-2 formed on the inner surface of the substrate 12 and a dotted line 20-2 with doubled arrow heads represents the plane of polarization by the polarizer 18-2 attached to the outer surface of the substrate 12.

In FIGS. 3 through 6, solid line 19-1, the direction of orientation by the orientation film 15-1 formed on the substrate 11, is substantially perpendicular to dotted line 19-2, the direction of orientation by the orientation film 15-2 disposed on the substrate 12.

Figure 3:
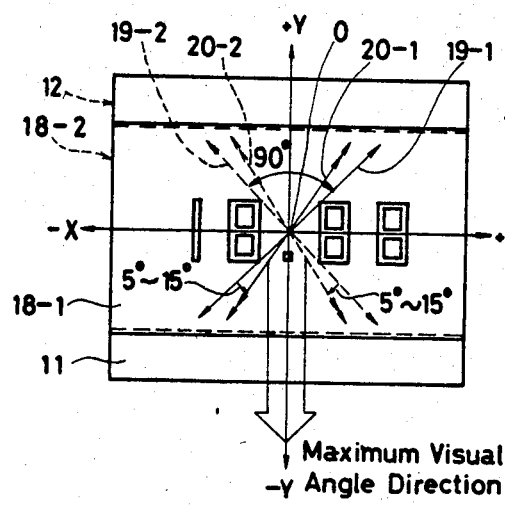
FIGS. 3 through 6 are plan views of the liquid crystal displays for illustrating the principle of the present invention.
Figure 4:
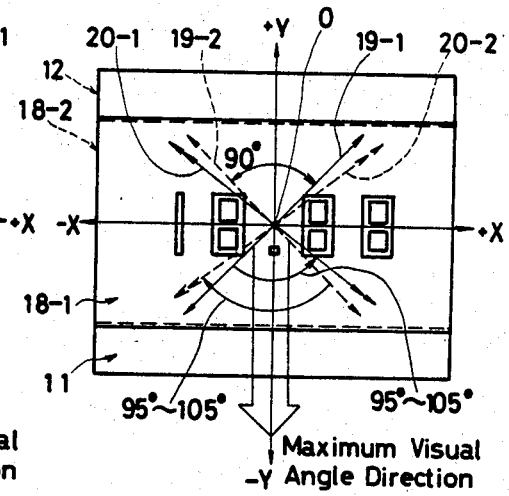

The liquid crystal displays of FIGS. 3 and 4 are characterized by dotted line 19-2 the orientation of film 15-2, being substantially at an angle of −45° with respect to the X axis and in the XY plane of the rectangular coordinates system as defined in FIG. 1. Line 19-1, the orientation of film 15-1, lies substantially at 45° to the X axis on the XY plane of the rectangular coordinates system.

In the arrangement described above, the molecular of the liquid crystal mixture 17 sustained between the orientation films 15-1 and 15-2 are oriented such that rotation of each major axis of the liquid crystal molecules is counterclockwise or levorotatory at a substantially right angle between the surfaces of the orientation films 15-1 and 15-2 when no electric filed is applied to the liquid crystal display. As indicated in FIGS. 3–6, the maximum visual angle is in the direction of the negative Y axis. The maximum visual angle direction is the direction along which the maximum angle between a line of sight and the Z axis is defined from a position where the viewer may view any image on the liquid crystal display.

Figure 5:
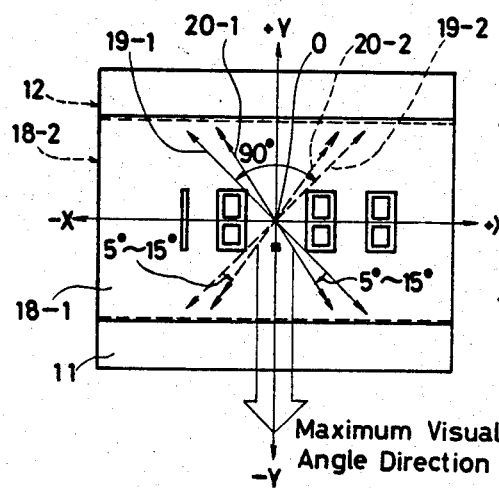
Figure 6:
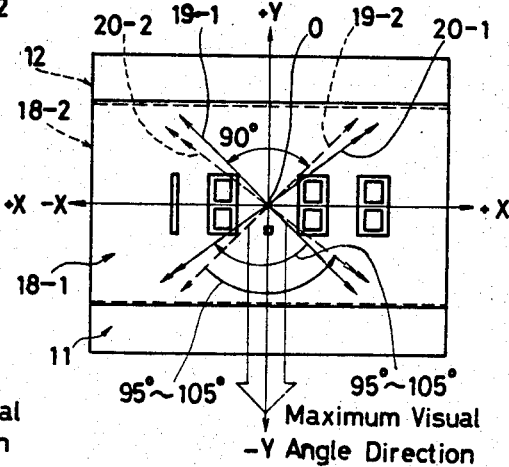

In FIGS. 5 and 6, on the other hand, the liquid crystal display is characterized by the dotted line 19-2, the orientation of film 15-2, being at an angle of substantially +45° with respect to the X axis of the XY coordinate plane and the solid line 19-1, the orientation of film 15-1 is at substantially −45° to the X axis.

This specific arrangement differs somewhat from that of FIGS. 3 and 4, and is characterized by the molecules of the liquid crystal mixture 17 interposed between the orientation films 15-1 and 15-2 being tilted such that rotation of each major axis of the liquid crystal molecules is clockwise or dextrorotatory with an angle of substantially 90°. The maximum visual angle direction in FIGS. 5 and 6 is negative y axis like the cases of FIGS. 3 and 4.

The levorotatory liquid crystal display of FIG. 3 is further characterized in that the polarizer 18-2 is attached to the substrate 12 such that the dotted line 20-2 representing the polarizer 18-2 lies at an angle of about 5°–15° in a clockwise direction to dotted line 19-2 representing the orientation film 15-2. In addition, the polarizer 18-1 is attached to the substrate 11 such that the solid line 20-1 representing the polarizer 18-1 lies at an angle of about 5°–15° in a counter-clockwise direction to solid line 19-1 representing the orientation film 15-1.

The dextrorotatory liquid crystal display of FIG. 5 is further characterized in that each of the polarizers 18-2 and 18-1 is attached to the substrates 12 and 11 such that the dotted line 20-2 representing the polarizer 18-2 is at an angle to the dotted line 19-2 representing the orientation film 15-2, in order of about 5° through about 15° in a counterclockwise direction, and that the solid line 20-1 representing the polarizer 18-1 is set at an angle to the solid line 19-1 representing the orientation film 15-1, in the order of about 5° through about 15° in a clockwise direction.

Thus the liquid crystal displays of FIGS. 3 and 5 are completed such that the direction 20-1 of the plane of polarization by the polarizer 18-1 does not parallel the direction 20-2 of the plane of polarization by the polarizer 18-2.

When a certain voltage over a threshold voltage Vth is applied to the liquid crystal displays of FIGS. 3 and 5, a good color image is visible wherein the patterned symbols or images are black against a background colored desirably, for example, green or pink.

The levorotatory liquid crystal display of FIG. 4 is characterized in that the polarizer 18-1 is attached to the substrate 11 such that the solid line 20-1 representing the polarizer 18-1 is at an angle to the solid line 19-1 representing the orientation film 15-1, in order of about 95° through about 105° in a counterclockwise direction. In addition, the polarizer 18-2 is attached to the substrate 12 such that the dotted line 20-2 representing the polarizer 18-2 is at an angle to the dotted line 19-2 representing the orientation film 15-2, in the order of about 95° through about 105° in a clockwise direction.

The dextrorotatory liquid crystal display of FIG. 6 is characterized in that each of the polarizers 18-2 and 18-1 is attached to the substrates 12 and 11 such that the dotted line 20-2 representing the polarizer 18-2 is at an angle to the dotted line 19-2 representing the orientation film 15-2, in the order of about 95° through about 105° in a counterclockwise direction, and that the solid line 20-1 representing the polarizer 18-1 is at an angle to the direction represented by the solid line 19-1 representing the orientation film 15-1, in the order of about 95° through about 105° in a clockwise direction.

Thus the liquid crystal displays of FIGS. 4 and 6 are fabricated so that the direction 20-1 of the plane of polarization of the polarizer 18-1 is not perpendicular to the direction 20-2 of the plane of polarization of the polarizer 18-2.

When a certain voltage over a threshold voltage Vth is applied to the displays of FIGS. 4 and 6, a good color image is visible wherein the patterned symbol or image is black against a background colored desirably, for example, green or pink.

Figure 8:
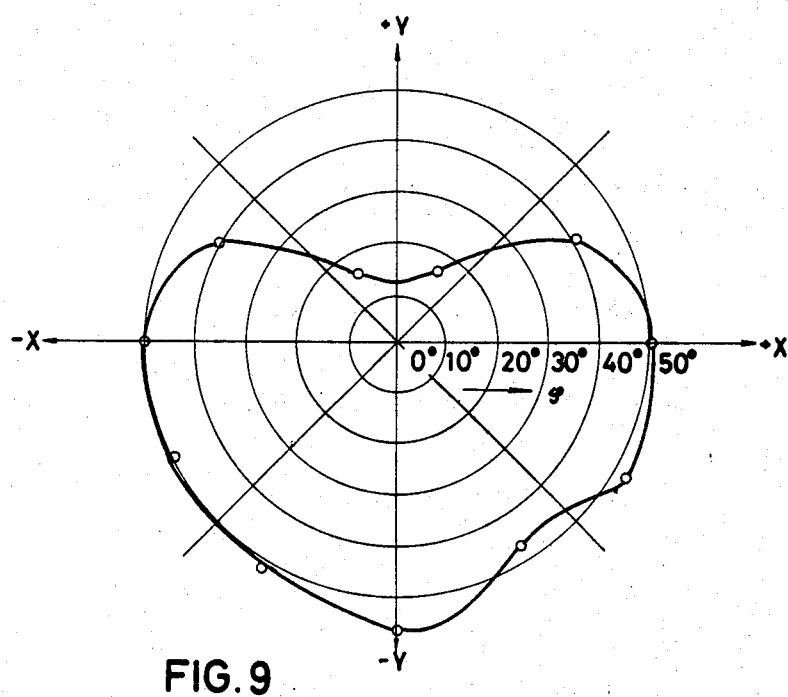
FIGS. 8 and 9 are graphs respectively showing the viewing angle dependency of a conventional twisted nematic field effect mode liquid crystal display and the liquid crystal display embodying the present invention.
Figure 9:
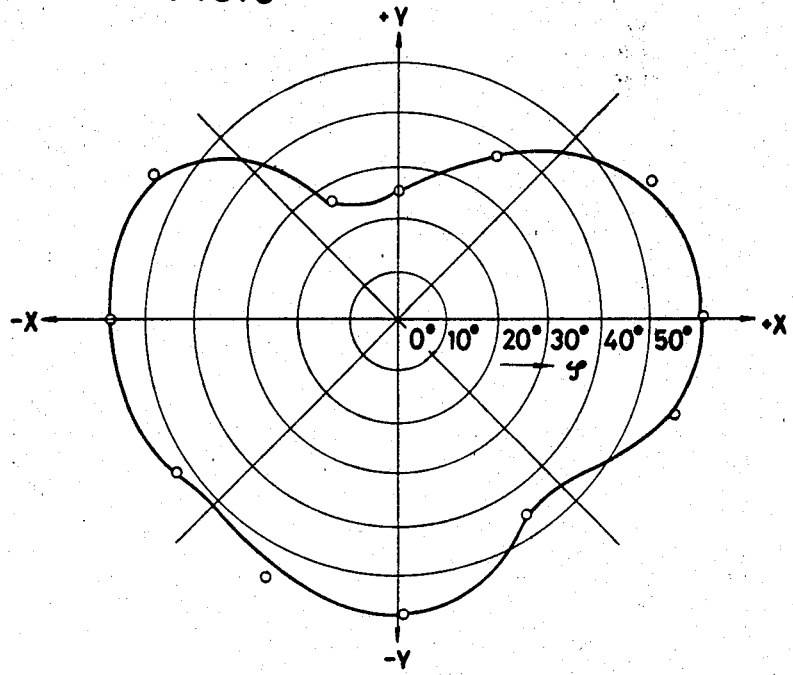

FIGS. 8 and 9 show graphs representing viewing angle dependency of a conventional twisted nematic field mode liquid crystal display and the liquid crystal display embodying the present invention, respectively. These graphs were obtained by the same experimental condition.

A conventional liquid crystal display is different from the liquid crystal display of the present invention in that one of a pair of polarizers has a plane of polarization substantially parallel with or perpendicular to each major axis of molecules along the direction oriented by an orientation film, and that the other of the pair of polarizers has a plane of polarization substantially parallel with or perpendicular to the plane of polarization by the one polarizer. Behind the polarizer 18-2, there is positioned a light source for generating radiation applied to the liquid crystal display. A certain voltage over a threshold voltage Vth is applied between the patterned electrodes 13 and 14.

As shown in FIG. 8, the angle $\phi$, between the viewing direction and the Z axis, as shown in FIG. 1, defining a field in which a clear image of the display is visible, is limited to about 50° in the X and the −X directions and to about 10° in the +Y direction. This is generally insufficient for many display purposes.

In FIG. 9, the angle φ for the present invention, defining an improved field within which a clear image is visible, reaches about 60° in the X and the X directions to an extent which is approximately equal to the magnitude of the maximum visual angle in the Y direction. The angle φ reaches about 25° in the Y axis. These values represent a substantial improvement as compared to the prior art, as shown in FIG. 8; up to about 10° in the X, Y, and −X directions. Thus a broader field of view is obtained.

Table 1 shows amounts of γ property as defined by Vsat/Vth (Vsat: a saturation voltage, Vth: a threshold voltage) in connection with the above referenced conventional liquid crystal display and the liquid crystal display of the present invention.

TABLE 1

|  | Conventional Type | | Present Invention | |
|---|---|---|---|---|
| a substantial angle θ formed between the oriented direction and the plane of polarization in the polarizer | 0° | 90° | 10° | 100° |
| an amount of γ property | 1.77 | 1.77 | 1.49 | 1.50 |

As is apparent from Table 1, γ property of the present liquid crystal display is remarkably improved as compared to the conventional display.

Figure 7:
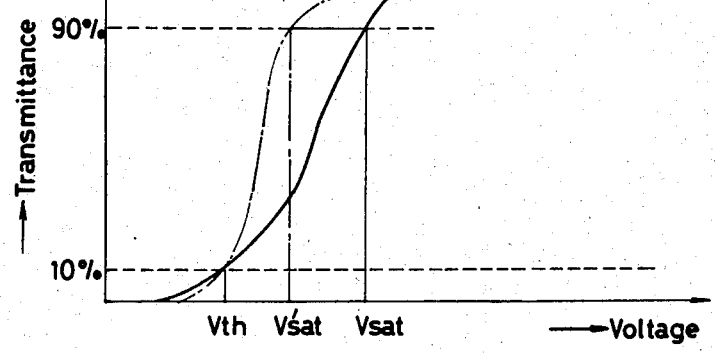
FIG. 7 is a graph showing $\gamma$ properties varied in accordance with light absorption ratio and voltage applied to the liquid crystal display.

FIG. 7 is a graph indicating γ property varied in accordance with light absorption ratio transmittance and voltage applied to the liquid crystal display. The solid line in the graph of FIG. 7 represents γ property of the conventional type display while the chain line indicates γ property of the present invention. The chain line has a rising curve which is more abrupt than the sollid line. In the liquid crystal display of the present invention, a high duty ratio is obtained.

The best γ property is achieved by the present invention when the angle θ formed between the oriented direction 19-1 and the plane of orientation direction 20-1, and/or between the oriented direction 19-2 and the plane of orientation direction 20-2 is about 7.5° through about 10° or about 97.5° through about 100°.

While only certain embodiments of the present invention have been described, it will be apparent to those skilled in the art that various changes and modifications may be made therein without departing from the spirit and scope of the invention as claimed.

What is claimed is:

1. A twisted nematic field effect mode liquid crystal display cell comprising:
   a liquid crystal layer;
   first and second substrates on opposite sides of said liquid crystal layer;
   first and second polarizers attached to respective outer surfaces of said first and second substrates, said polarizers having first and second planes of polarization;
   first and second orientation films formed on respective inner surfaces of said first and second substrates for orienting molecules of said liquid crystal layer in first and second orientation directions;
   wherein each of said planes of polarization is rotated with respect to one of said first and second orientation directions forming angles therebetween, said angles being greater than or less than zero degrees and greater than or less than 90 degrees.

2. A display cell as in claim 1 wherein at least one of said angles is substantially 5–15 degrees.

3. A display cell as in claim 1 wherein at least one of said angles is substantially 95–105 degrees.

4. A display cell as in claim 1, wherein at least one of said angles is substantially 7.5–10 degrees.

5. A display cell as in claim 1 wherein at least one of said angles is substantially 97.5–100 degrees.

* * * * *